US006526031B1

United States Patent
Zaff et al.

(12) United States Patent
Zaff et al.

(10) Patent No.: US 6,526,031 B1
(45) Date of Patent: Feb. 25, 2003

(54) FORWARD POWER CONTROL DETERMINATION IN SPREAD SPECTRUM COMMUNICATIONS SYSTEMS

(75) Inventors: David Zaff, Budd Lake, NJ (US); Abdulkadir Dinc, Jersey City, NJ (US)

(73) Assignee: Motorola, Inc., Schaumburg, IL (US)

( * ) Notice: Subject to any disclaimer, the term of this patent is extended or adjusted under 35 U.S.C. 154(b) by 59 days.

(21) Appl. No.: 09/886,640

(22) Filed: Jun. 21, 2001

(51) Int. Cl.[7] ................................................. H04J 13/02
(52) U.S. Cl. ....................................... 370/335; 375/130
(58) Field of Search ................................. 370/203, 200, 370/320, 335, 342, 441, 329; 455/522; 375/130, 144, 346, 349

(56) References Cited

U.S. PATENT DOCUMENTS 5,930,288 A * 7/1999 Eberhardt ................... 375/200
6,097,972 A * 8/2000 Saints et al. ................ 455/572
6,233,439 B1 * 5/2001 Jalali ........................ 455/127

OTHER PUBLICATIONS

Rohani et al., "A Comparison of Fast Forward Power Control Methods", Submission to 3GPP Technical Review Committee TR 45.5.3.1/98.10.19.04, 1998.

Park, J., "Further Explanations on IS–2000.2–A Ballot Comments", comment to IS–2000.2–A, 3GPP2–C30–20000215–020, Feb., 2000.

PN–4694, IS–2000.2A Ballot comments, 3GPP2.

Chen et al., "New Forward Power Control Modes", comment to IS–2000.2–A, 3GPP2–C30–20000210–009, Feb., 2000.

* cited by examiner

*Primary Examiner*—Ken Vanderpuye
(74) *Attorney, Agent, or Firm*—Brian M. Mancini (57) ABSTRACT

A spread spectrum communications system where power control mitigates received signal fluctuations. An implementation is described for forward power control wherein received data is checked for errors. Where an error is detected energy levels of the power control bits and traffic bits are determined. The energy level of the power control bits is compared against a first predetermined threshold wherein if the energy level of the power control bits is less than the first predetermined threshold an increased in forward power is requested. Otherwise, the energy level of the traffic bits are compared against a second predetermined threshold wherein if the energy level of the traffic bits is less than the second predetermined threshold a decrease in forward power is requested. Otherwise an increase is requested.

20 Claims, 5 Drawing Sheets

FORWARD POWER CONTROL DETERMINATION IN SPREAD SPECTRUM COMMUNICATIONS SYSTEMS

FIELD OF THE INVENTION

The present invention relates generally to wireless communications. More particularly, the invention is directed to power control in a code division multiple access (CDMA) wireless communication system.

BACKGROUND OF THE INVENTION

The relative power used in each data signal transmitted by the base station in spread spectrum communications systems require control in response to information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. Thus, output power must be controlled to guarantee enough signal strength received at the base station and to maintain good quality audio while minimizing the potential for interference.

Additionally, since a CDMA and new CDMA2000 wideband channel is reused in every cell, self-interference caused by other users of the same call and interference caused by users in other cells represents a limiting factor to the capacity of the system. Moreover, the interference coming from the neighboring base stations may not fade with the signal from the active base station as would be the case for interference coming from the active base station. Due to fading and other channel impairments, maximum capacity is achieved when the signal-to-noise ratio (SNR) for every user is, on the average, at the minimum point needed to support "acceptable" channel performance. A remote unit in these situations may require additional signal power from the active base station to achieve adequate performance.

Communication systems are known to employ power control methods which control transmission energy of remote units. Power control in a spread spectrum system serves two main functions. Firstly, because each remote unit's signal in a spread spectrum system is typically transmitted in the same frequency, a majority of the noise (i.e., inversely proportional to bit energy per noise density, Eb/No, defined as the ratio of signal energy per information-bit to noise power spectral density) associated with a received signal can be attributed to other remote units' transmissions. The magnitude of noise is directly related to the received signal power of each of the other remote units' transmissions. Thus, it is beneficial for a remote unit to transmit at a low power level. Secondly, it is desirable to dynamically adjust the power of all remote units in such a way that transmissions are received by the base station with approximately the same power level.

Dynamic power control of the mobile station's transmitter includes two elements: open loop estimation of transmit power by the mobile station, and closed loop correction of the errors in this estimate by the base station. The closed loop operation is known and will not be discussed here. In open loop power control, each mobile station estimates the total received power on the assigned CDMA frequency channel. Based on this measurement and a correction supplied by the base station, the mobile station's transmitted power is adjusted to match the estimated path loss, to arrive at the base station at a predetermined level.

CDMA2000 base stations puncture power control bits on the forward fundamental channel (F-FCH) and forward-dedicated control channel (F-DCCH) in an effort to ensure that constant mobile power is received at the base station. Estimates of the signal-to-noise ratio in these power control bits can be used by the mobile to determine whether the base station transmit level matches the targeted Eb/No. The F-FCH can transmit only a continuous stream of traffic data, but transmission of F-DCCH traffic data can be discontinued or resumed on a frame-by-frame basis without notification by the base station. Power control via the continuous F-FCH channel is known and need not be discussed here. However, power control via discontinuous transmission on the F-DCCH makes it more difficult for the mobile station to estimate the appropriate signal power.

What is needed is a reliable implementation for power control using the F-DCCH. In particular, it would be of benefit to provide more reliable performance of forward power control during periods of discontinuous transmission on the F-DCCH. It would also be of benefit if the above improvement could be provided in a simple hardware implementation such as in an application-specific integrated circuit (ASIC).

DETAILED DESCRIPTION OF THE PREFERRED EMBODIMENTS

The present invention detects if a signal is present on a CDMA2000 F-DCCH channel during discontinuous traffic transmission, and identifies a useful and practical way to determine total traffic and power control bit SNR during discontinuous traffic transmission on the F-DCCH. The performance of forward power control during the operation of discontinuous traffic transmission on the F-DCCH is improved by increasing the probability that signals are correctly detected when present. This scheme calculates the SNR of both traffic and power control bits by accumulating power received on each finger over successive power control groups using unrotated symbols prior to the RAKE combiner. This is accomplished in a simple ASIC hardware implementation.

In practice, the SNR per RAKE finger for the F-DCCH traffic channel is obtained in an inner-loop circuit using: unrotated power control symbols of the power control bit (PCB) for $Es_{pcb}$ (energy per symbol for the power control bits) determination, unrotated forward traffic symbols for $Es_{traf}$ (energy per symbol for the traffic bits) determination, and pilot symbols integrated over a predetermined number of chips per RAKE finger for noise power determination. Preferably, sixty-four chips are used for noise power determination. The noise power is scaled according to the traffic Walsh length before calculating the expected noise symbol power, Ns, per RAKE finger. In addition, the present invention is effective whether or not a given F-DCCH frame contains traffic data.

A CDMA2000 F-DCCH (Forward Dedicated Control Channel) supports intermittent or discontinuous traffic from the base station (BS), where the traffic can be continued or stopped without Layer 3 messaging passing from the BS to the mobile, as is known in the art. It becomes important for the mobile to determine from the received signal level whether there is traffic data (or signal power) on the F-DCCH in any given frame. This present invention effectively distinguishes between the case when traffic is being transmitted on the F-DCCH and the case when no traffic is being transmitted. Under such circumstances the mobile continues to receive power control information on the F-DCCH from the BS, i.e. PCB's are still transmitted on the traffic channel even if there is no traffic data). The F-DCCH power control bits (PCB's) must have sufficient energy to be correctly interpreted by the mobile. In the absence of F-DCCH traffic, the mobile must continue to determine the energy level of the PCB bits and request more power from the BS when this level is insufficient. As a result, when traffic transmission is resumed by the BS the received power level at the MS is at an appropriate level. More specifically, the mobile sends a new quality of information bit (QIB) bit back to the BS at a rate of 50 Hz. More specifically the same QIB bit is transmitted for all power control groups (PCG's) during each frame on the power control sub-channel of the reverse pilot channel (R-PiCH) at a rate of 800 Hz, but is only updated at a 50 Hz rate.

Figure 1:
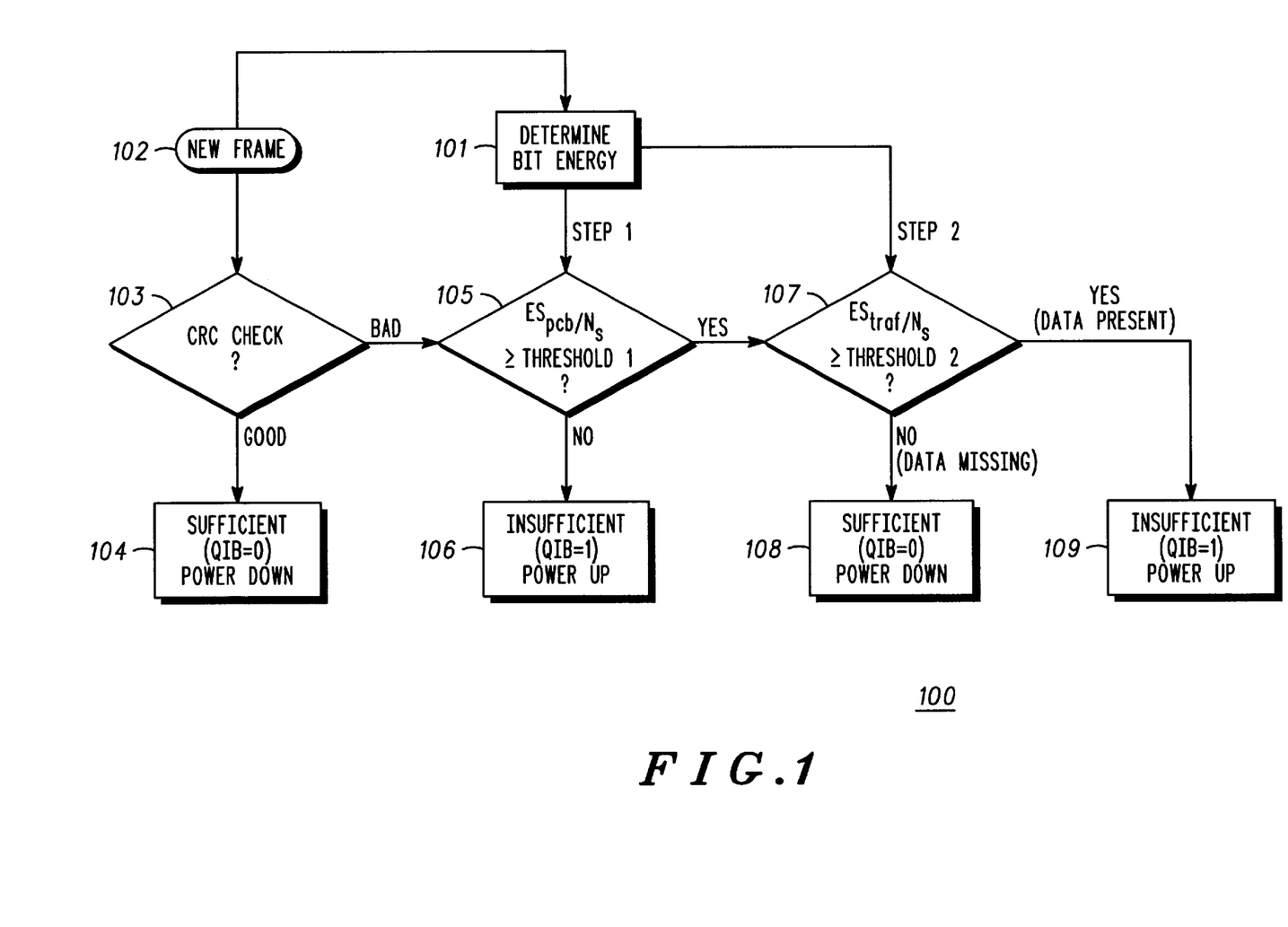
FIG. 1 illustrates a flow chart implementing forward power, in accordance with the present invention.

FIG. 1 shows a flow chart to decide during discontinuous transmissions on the F-DCCH whether to transmit a QIB of 1 or 0 on the power control sub-channel of the R-PiCH. A QIB bit of 1 informs the BS that either an F-DCCH frame error has occurred or, if no F-DCCH signal is detected in the current frame, that there is insufficient power in the PCB bits. The mobile station (MS) requests the BS to increase its power level accordingly by sending the QIB bit of 1. A QIB bit of 0 indicates either a correctly decoded F-DCCH frame or that no F-DCCH traffic was detected and there is sufficient power in the PCB bits.

The present invention provides a method 100 for forward power control in spread spectrum communication systems by determining what QIB bit to send, as follows. A first step 101 is inputting data from a receiver. Specifically, the data is intermittent or discontinuous F-DCCH data from a RAKE receiver and is input one frame at a time, as the power control bits are transmitted in each frame. More specifically, the data are unrotated symbols of the traffic data also containing the PCB's. A next step 103 includes providing an error check to determine which of the data is in error. In particular, a cyclic redundancy code (CRC) check is done on each frame of data to determine if there is a frame error. If there no error is found then the present forward power from the BS is sufficient and may be decreased 104. However, the present invention is concern about those instances where the current F-DCCH frame has a CRC error. A next step 101 is determining an energy level of the F-DCCH PCB bits and the traffic bits. Specifically, the symbol energy, is determined for the PCB's and traffic data. A next step 105 (Step 1 in FIG. 1) includes comparing the energy level of the power control bits against a first predetermined threshold. If the energy level of the power control bits is less than the first predetermined threshold, a next subsequent step 106 would be indicating the need for increased forward power, requesting the same from the BS, and returning to the inputting step 102. However, if the energy level of the PCB bits is greater than or equal to the first threshold then process would continue with step 107 (Step 2 in FIG. 1) to determine if traffic is being transmitted in the current frame of data from the BS. This step 107 includes comparing the energy level of the traffic bits, from the determining step 101, against a second predetermined threshold wherein if the energy level of the traffic bits is less than the second predetermined threshold, a next subsequent step 108 would be indicating the need for decreased forward power and requesting the same from the BS. Otherwise, the next step 109 would be indicating the need for increased forward power and requesting the same from the BS. Most importantly, if sufficient traffic energy is detected, as tested against a second predetermined threshold, to determine that a F-DCCH traffic frame was transmitted, then the current frame is in error and the QIB bit is set to 1 to request more power from the BS. If insufficient traffic energy is detected, as tested against the second threshold, indicating that no traffic data is detected as being sent in the current frame, then the BS is transmitting with sufficient power and the QIB bit is sent to 0 to request the BS to step down in power. A last step is returning to the first step 102 to repeat the process for all subsequent frames of data.

A novel aspect of the present invention is in determining the traffic energy and the appropriate second threshold. This differs from the prior art in Step 2 which uses the traffic to PCB expected symbol energy ratio, $Es_{traf}/Es_{pcb}$, as will be explained below. In contrast, the traffic signal to noise ratio, $Es_{traf}/Ns$, maximally combined over all multipath of the F-DCCH channel, is used in the second threshold in the QIB determination of the present invention. A signal-to-noise ratio of the PCB's, $Es_{pcb}/Ns$, is also used to advantage in the present invention. The noise power density, Ns, is obtained from a pilot path of the RAKE receiver. In particular, the signal-to-noise ratios of the traffic and power control bits are determined over all locked receiver fingers and power control groups of the frame minus a normalization correction of an expected ratio of a noise power per symbol of the power control bits divided by a noise power per symbol of a pilot channel of the input data. The noise power per symbol of both the PCB's and pilot channel are assumed to be Gaussian random variables in simulation. For example, the expected value (the value obtained by averaging over all samples) is approximated numerically by running a simulation for 10,000 frames to determine the desired ratio.

The calculation of the total Es/Ns for inner loop forward power control in a CDMA2000 mobile station is achieved in the present invention with minimal hardware. In practice, total Es/Ns determination utilizes unrotated traffic symbols, i.e., traffic symbols prior to pilot weighting before a RAKE combiner, where the time aligned and pilot weighted traffic symbols from all the multipaths are added together. As a result, there is a fifty percent hardware reduction from about 15K gates to about 7K gates. Herein, the Eb/Ns determination per RAKE finger for the forward traffic channel is done using unrotated PCB symbols for Es determination in case of variable rate frames, unrotated forward traffic symbols for Es determination in case of fixed rate frames, and pilot symbols integrated over a predetermined number of chips per RAKE finger for noise power determination. Preferably, sixty-four chips are used for the noise power determination. In addition, the noise power density is scaled according to the traffic Walsh length before calculating the Es/Ns.

The existing CDMA Interim Standard (IS-95 et seq.) was developed by the Telecommunications Industry Association (TIA) and Electronics Industry Association (EIA). In IS-95, when a transmission rate is utilized which is less than the full rate, a discontinuous (burst type) signal is transmitted. This signal is divided into logical frames which are 20 ms (milliseconds) in length. The frames are divided into 16 smaller portions (or slots) which are referred to as power control groups. The mobile station demodulator determines the energy of each power control group received from the base station.

In CDMA2000, the mobile station needs to support both inner and outer power control loops for the forward link traffic channel power control. The outer power control loop in the mobile station (MS) determines a target Es/Ns setpoint value required to achieve the target frame error rate (FER) on each assigned forward traffic channel. However, in the present invention, the inner power control loop compares the Es/Ns of the received forward traffic channel with the thresholds as will be detailed below. This determines the value of the power control bit or the quality indicator bit (QIB) to be sent to the base station on the reverse power control subchannel.

In case of variable data rates, the punctured power control bits (transmitted on the forward link) are used to determine Es. In case of fixed data rates, the traffic Es determination is performed on all the traffic bits within that power group. Noise (Ns) is calculated from the common pilot channel. In the present invention, the Es and Ns determinations are done on each of the individual RAKE fingers. These are combined to obtain the total Es and Ns.

Figure 2:
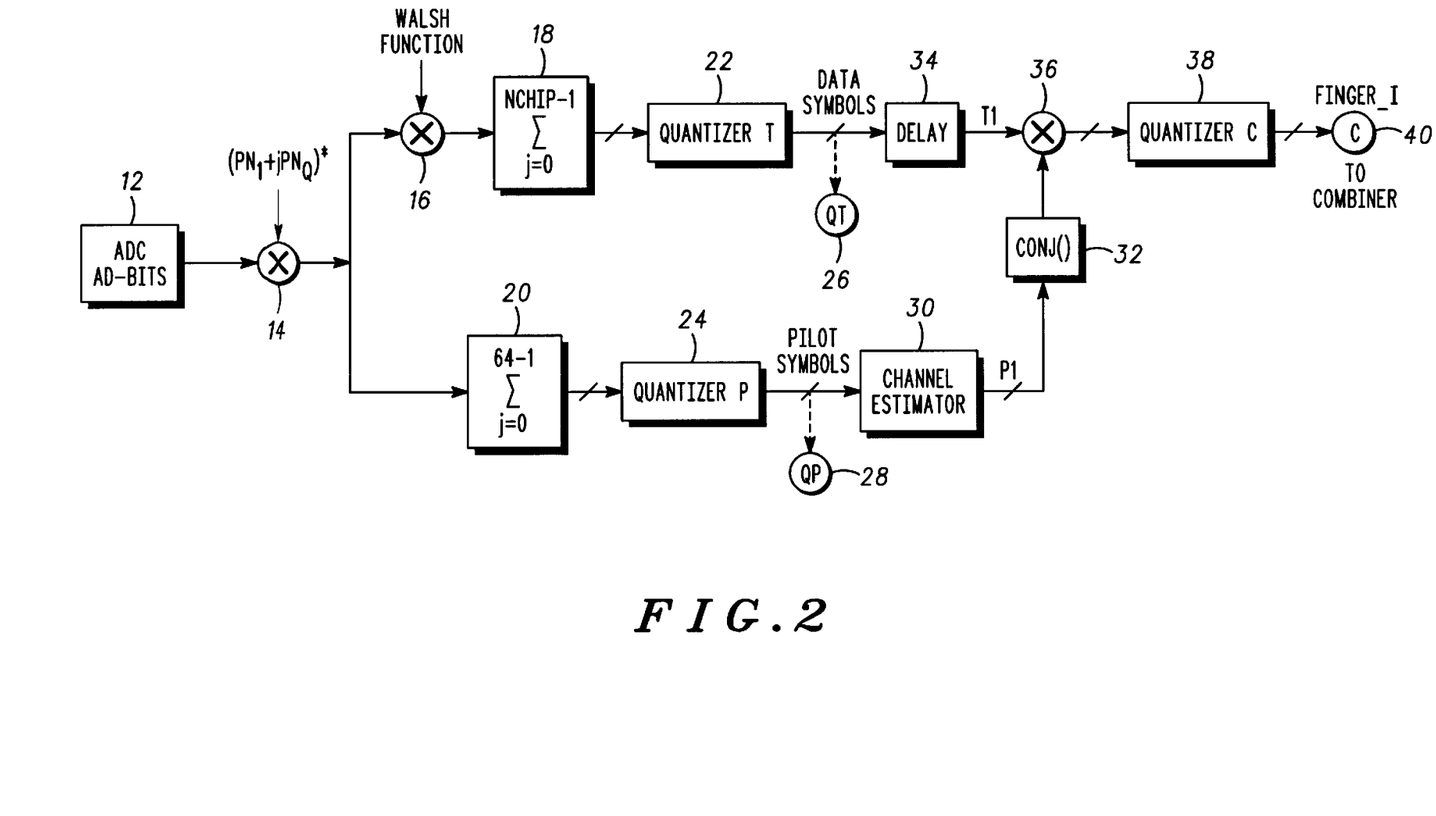
FIG. 2 illustrates a RAKE receiver implementation per finger, in accordance with the present invention.

A typical RAKE receiver architecture for a single finger is shown in FIG. 2. In a multi-finger rake architecture, duplicate structures are provided. For example, with three or more multipath signals, a three-finger rake architecture, with three duplicate structures can be provided where all three fingers are summed at a common point such that the three fingers form a three multipath combiner.

For the single finger 10 of FIG. 2, an analog to digital converter (ADC) 12 provides converts an input signal from a RF section (not shown) of a communication device into digital data, as is known in the art. Each RAKE finger input is presented to a digital mixer 14 for multiplication with a complex factor to separate the traffic and pilot signals into a traffic path (upper) and pilot path (lower). A Walsh function operates on the traffic signal at mixer 16, and a summation 18 integrates N chips of the input signal. Similarly, the pilot path provides a summation 20 over a predetermined (e.g., sixty-four) number of chips. As discussed further below, in the traffic path a quantizer 22 outputs traffic data symbols (QT) 26 as quantized traffic data, and the pilot signal is generated at quantizer 24 which outputs pilot symbols (QP) 28. A channel estimator 30 operates on the pilot symbols 28 followed by a complex conjugate function 32 for mixing the pilot and traffic paths via delay 34 being multiplied at 36 prior to quantizer 38. QT is the point at which unrotated traffic or PCB bits are extracted for symbol energy calculations, while the noise estimates make use the quantized pilot symbols extracted at point QP. Output C 40 provides a signal which can be called Finger_i (e.g., Finger_1). A duplicate architecture of FIG. 2 is provided for Finger_2, and so forth. The traffic data, QT (26), is tapped from each finger of the RAKE receiver 10 for Es energy calculations of the power control bits and the traffic bits. As discussed in connection with FIG. 1, the total symbol energy of the data is compared to a first and second predetermined threshold, as will be detailed below.

The RAKE receiver, which is so named because it "rakes" all the multipath contributions from the fingers together, uses a form of diversity to collect the signal energy from the various received signal paths, i.e., the various signal rays. Diversity provides redundant communication channels so that when some channels fade, communication is still possible over non-fading channels. A received radio signal is demodulated by, for example, mixing it with cosine and sine waveforms and filtering the signal in an RF receiver 1, yielding I and Q samples. A CDMA RAKE receiver combats fading by detecting the multipath echo signals individually using a correlation method and adding them algebraically (with the same sign). Further, to avoid intersymbol interference, appropriate time delays are inserted between the respective detected echoes so that they fall into step again.

Current implementations of mobile stations use a "finger lock" mechanism to exclude unreliable power control signals from the decision logic. The outputs at the RAKE taps are combined with appropriate weights. The receiver searches for the earliest ray by placing RAKE tap outputs having significant energy appropriately weighted and combined to maximize the received signal to noise and interference ratio. On each finger of the RAKE receiver, the demodulated signal energy is compared to a threshold which represents a minimum energy required to reliably use power control data from that finger.

Generally, the RAKE receiver apparatus operates to detect the phases of pseudo-noise (PN) codes of signals from the multipaths that are demodulated in corresponding independent demodulators, corresponding in number to the multipaths, respectively. Correlation values of the signature sequence with the received signals at different time delays are passed through a delay line that is tapped at expected time delays (dt), the expected time between receiving echoes. The results obtained from the receivers after the demodulation are coupled together in a combiner to extract the desired timing information and demodulated data.

Figure 3:
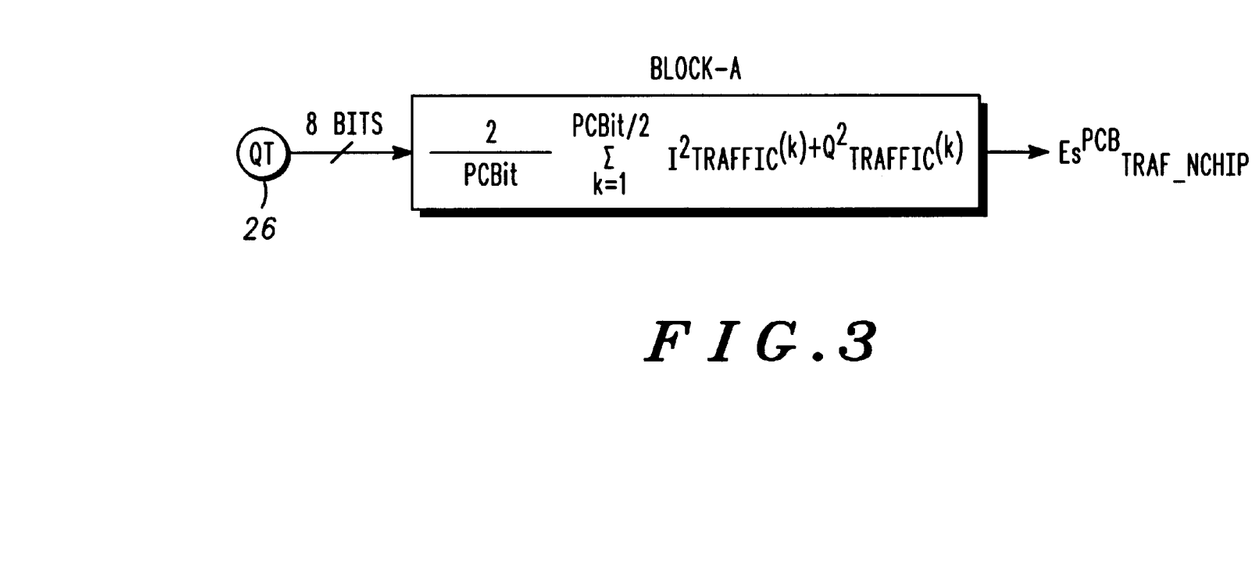
FIG. 3 illustrates Eb estimation per finger for variable frame rate, in accordance with the present invention.
Figure 4:
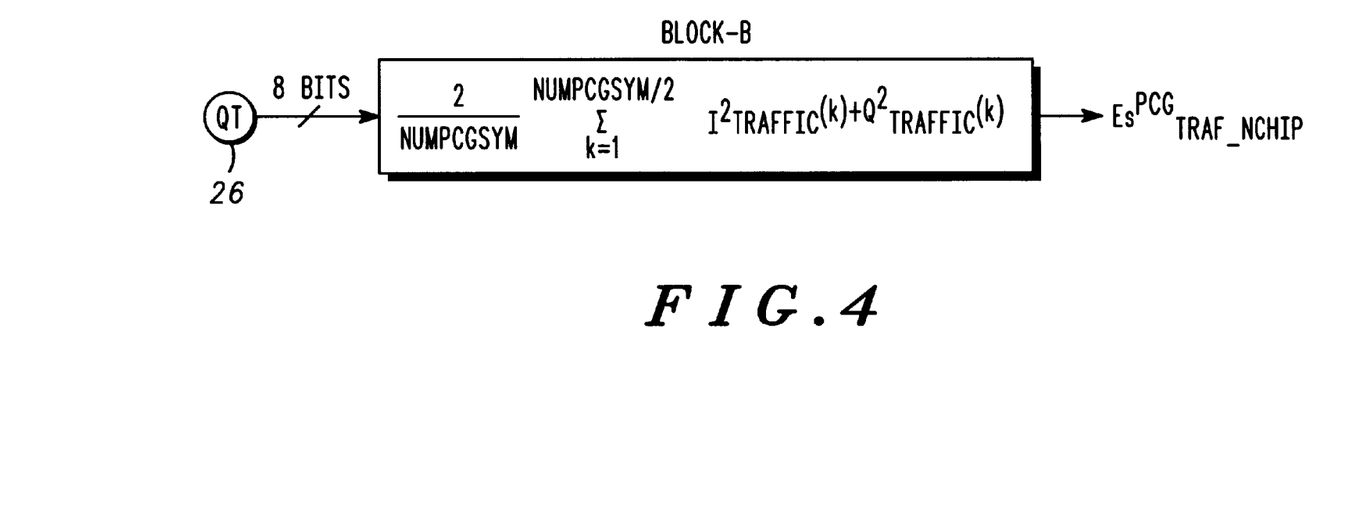
FIG. 4 illustrates Eb estimation per finger for fixed frame rate, in accordance with the present invention.
Figure 5:
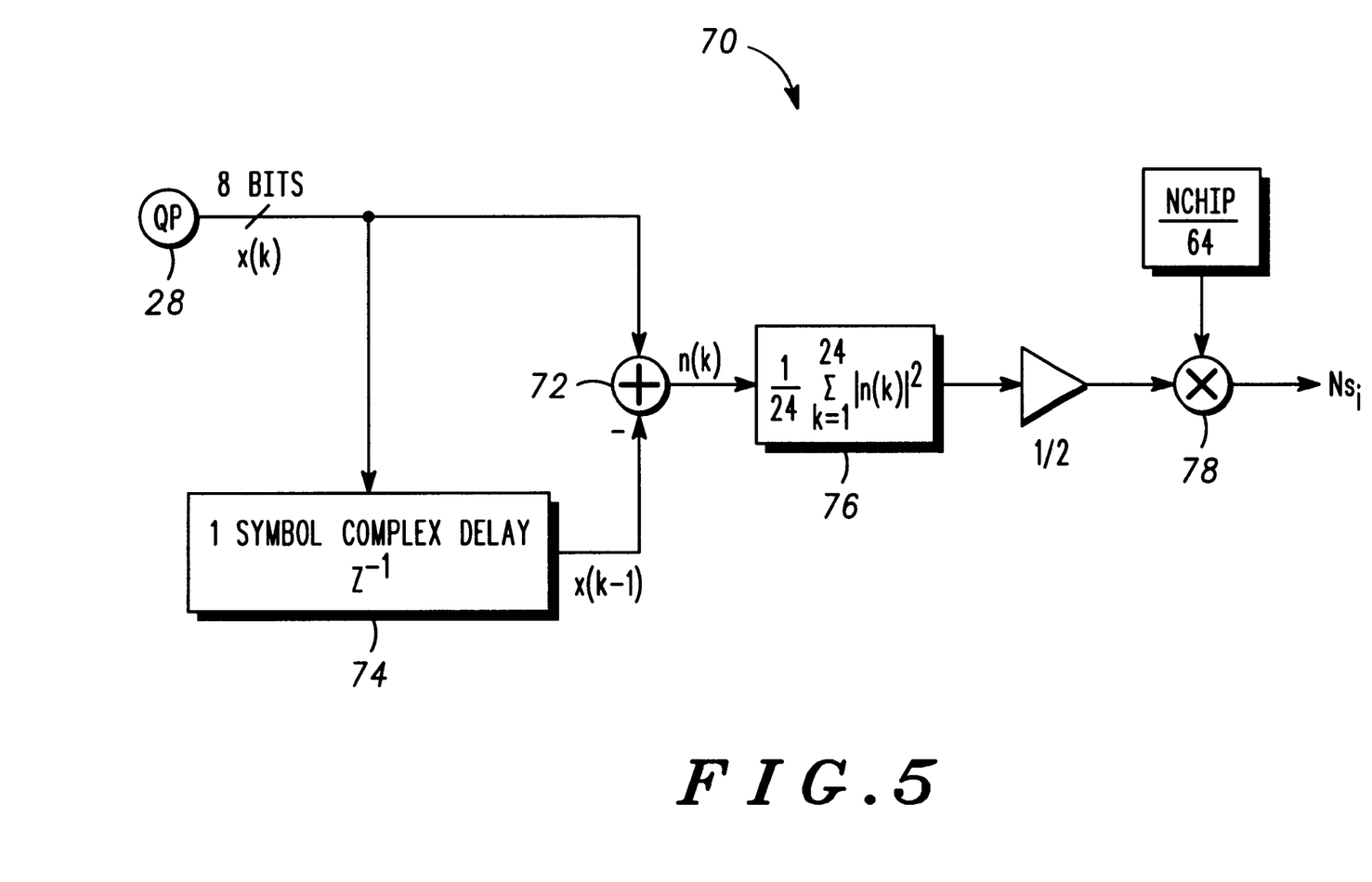
FIG. 5 illustrates fixed-point implementation for noise power estimation using 1-tap high-pass filter, in accordance with the present invention.

For variable frame rate data, the traffic Es determination is obtained using only the power control bits that are punctured on the forward traffic channel. In the case of fixed rate, Es is determined over all the traffic bits. $Es_{pcb}$ is obtained using only the power control bits that are punctured on the forward traffic channel. The Es determination for variable and fixed rate frames is implemented as shown in FIG. 3 and FIG. 4, respectively. FIG. 3 shows the traffic channel energy (Es) per finger for variable rate frames, where $$I_{Traffic}(k) + jQ_{Traffic}(k) = \sum_{chip=1}^{Nchip} I_{Traffic}(\text{chip}) + jQ_{Traffic}(\text{chip})$$

and PCBit is the number of power control symbols in one power control group (PCG). Nchip and TRAF_NCHIP are both the number of chips in one traffic symbol. In CDMA2000 this can be variable (32, 64, 128 etc). $Es^{PCB}{}_{TRAF\_NCHIP}$, is the symbol energy averaged over all the PCB symbols in one power control group. $Es_{traf}$ is determined over all the traffic symbols. FIG. 4 shows the traffic channel energy (Es) per finger for fixed frames. NUMPCGSYM is the number of symbols in one power control group. $Es^{PCB}{}_{TRAF\_NCHIP}$ is the symbol energy averaged over all the traffic and PCB symbols in one power control group. The subscript TRAF_NCHIP is used to note that these symbols have a duration that is TRAF_NCHIP chips long (which can be variable). Depending on whether one is looking at the Dedicated Channel, F-DCCH, or the Fundamental Traffic Channel, F-FCH, and depending on the radio configuration (RC) will determine whether one uses variable or fixed rate measurement (FIG. 4 or FIG. 5) of symbol energies. Optionally, both circuits can subtract instantaneous noise power from the traffic or PCB symbol energies.

Forward power control implementation, in which inner loop power is calculated for the total Es/Ns, uses unrotated traffic symbols for Es estimation for pilot symbols to estimate noise power density, i.e., the pilot symbols, at point QP, are used for noise power density estimation, Ns. The noise power estimation is implemented using 1-tap high pass filter 70 shown in the fixed-point implementation of FIG. 5. In this method, the delayed pilot symbol is subtracted at 72 from itself to calculate the expected noise power per symbol, $$Ns = E\{|n(k)|^2\} = \frac{1}{N}\sum_{k=1}^{N} |n(k)|^2$$

where n(k)=x(k)−x(k−delay)

with delay=1 pilot symbol duration and a one (1) symbol complex delay block 74, and $$x(k) = I_{pilot}(k) + jQ_{pilot}(k) = \sum_{chip=1}^{Nchips} I(\text{chip}) + jQ(\text{chip})$$

at $T_s$=Nchip/1.2288 Mhz where $T_s$ is the symbol duration which can be computed as Nchips (the number of chips per symbol) divided by the number of chips per second (the chip rate). Since Nchips is variable for CDMA2000, the symbol period is variable too.

Preferably, Ns is calculated over sixty-four chips of pilot while the $ES_{pcb}$ and $Es_{traf}$ are calculated over a Walsh length (Nchip=8, 16, 32, 64 or 128 chip duration). This is accomplished with an integrate/dump accumulator 76 at every power control group (PCG). A scaling 78 is performed on noise calculation over the pilot channel such that correct Es/Ns is calculated to normalize the noise power to the duration of the traffic symbols. The scaling factor is Nchip/64.

$$\frac{Es_{traf}}{Ns} = \frac{Es^{PCB}\text{traf\_Nchip}}{Ns} \cdot \frac{1}{\frac{Nchip}{64}}$$

EXAMPLE

Five test cases are identified as part of the simulation performance comparison. Two AWGN cases, a 1-path Rayleigh with 30 km/hr Doppler, a 2-path Rayleigh with 8 km/hr Doppler, and a 3-path Rayleigh with 100 km/hr were utilized, as are known in the art. All runs are made with F-DCCH traffic simulated using radio configuration 3 (RC3) at a data rate of 9600 bps, carrier frequency of 1900 MHz with no offset, Walsh length of 64 chips per symbol, Pilot Ec/Ior of −7 dB, 20 users, and an ADC with 4 bits finite precision, also as is known in the art. For reference these simulation cases are listed in Table 1.

TABLE 1

Simulation Tests Performed

| Case | Test Type | Ec/Ior | Ior/Ioc | FER | Relative Path Gains |
|---|---|---|---|---|---|
| 1 | AWGN only | −18.0 dB | −1 dB | 5.28% | n/a |
| 2 | AWGN only | −18.5 dB | −1 dB | 13.6% | n/a |
| 3 | Rayleigh 1-path Doppler 30 km/hr | −16.0 dB | +2 dB | 6.85% | n/a |
| 4 | Rayleigh 2-path Doppler 8 km/hr | −17.0 dB | +2 dB | 12.2% | (0,0) dB |
| 5 | Rayleigh 3-path Doppler 100 km/hr | −17.0 dB | +1 dB | 5.06% | (0,0,−3) dB | where AWGN is average white Gaussian noise, Ec is the energy per chip at the base station antenna, Ior is the total signal power spectral density measured at the base station antenna, Ioc is the total noise power spectral density measured at the mobile station antenna, and FER is the target frame error rate. The simulations were run for each of the five test cases, once with the F-DCCH traffic being transmitted at the given signal Ec/Ior level and once with the F-DCCH traffic bits zeroed out. All parameter cases are close to the limits of acceptable FER in order to get a bound on the performance limits of the algorithms in use.

In addition to the usual CDMA-2000 simulation parameters are the two F-DCCH thresholds shown in Step 1 and Step 2 of FIG. 1. Before performance can be assessed the values for the two thresholds used must first be determined. This is carried out by running the simulation code for Cases 1–5 above and collecting results on the statistical distributions. First, an optimal range for the first threshold (Threshold 1) is determined. Once this is known, step 1, represented by:

$$\frac{1}{N_{pcg}}\sum_{pcg=1}^{N_{pcg}}\left(\sum_{i=1}^{Npath} \frac{Es_{pcb,i}}{Ns_i}\right) - (Npath-1)E\left[\frac{Ns_{pcb}}{Ns}\right] \leq \text{Thr\_1}$$

where $N_{pcg}$ is the number of power groups per frame (typically sixteen), $N_{path}$ is the number of multipaths, $Ns_i$ are the noise symbol power samples for each branch corresponding to a locked finger, i.e. a finger receiving a signal with adequate power, E[ ] is the expected value of the ratio of the noise power per symbol in the PCB bits, $Ns_{pcb}$, to the noise power per symbol as estimated from the pilot channel, Ns. The calculation can be carried out to compute the average maximum combined energy ratio of the PCB bits to noise power over all power control groups in each frame. In addition, the calculation combines the SNR ratios for each multipath over all power control groups. This is used in comparison with Threshold 1. For the purpose of this simulation, the energy of all the PCB bits are added together in Step 1. For example in RC=3 at 9600 bps there are 4 PCB symbols (or two I,Q symbols) per PCG (power control group).

In the simulation the noise estimates were calculated using a high pass filter method as applied to the pilot channel in FIG. 5. The second term above is a normalization correction for when more than one path is summed and involves subtracting off the expected value of the ratio of the noise power per symbol in the PCB bit to the estimated pilot channel noise power per symbol. $Ns_{pcb}$ and $Ns_{traf}$ (below) are noise estimates for PCB and traffic symbols respectively, obtained from those channels when no signal is present. $E(Ns_{pcb}/Ns)$ was obtained empirically from the simulation platform using the one-path AWGN Case I.

Figure 6:
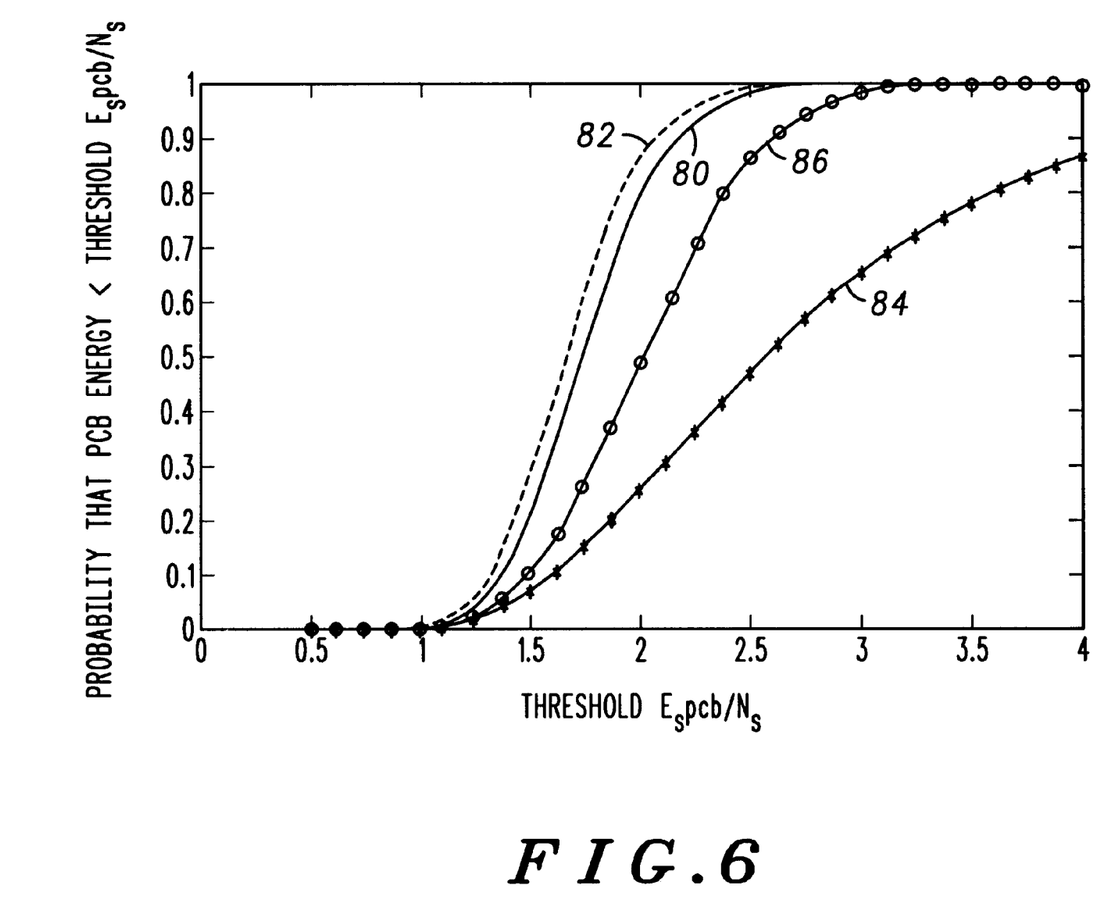
FIG. 6 is a graph showing the performance comparison between a prior art forward power control method and the present invention.

For the one-path case it was determined to select 1.375–1.5 (1.38–1.76 dB) as the optimum $Es_{pcb}/Ns$ range for threshold 1. The choice of $Es_{pcb}/Ns$ threshold=1.375 results in requests for more base station power 9%, 14%, 4.7% of the time for Cases 1 2, and 3 respectively. To normalize the two and three-path cases, the respective values one and two, multiplied times $E[Ns_{pcb}Ns] \cong 0.9$ were subtracted from probability distributions. Note that $E[Ns_{pcb}Ns]$ is the expected noise power estimated from the PCB bits divided by the noise power estimated from the variance of the pilot. $E[Ns_{pcb}/Ns]$ is obtained from $E[Es_{pcb}/Ns]$ when no data signal is present. Optimum ranges for $Es_{pcb}/Ns$ thresholds for 1, 2, and 3-path scenarios then remain at 1.375–1.5 as demonstrated in FIG. 6 which shows the cumulative probability of $Es_{pcb}/Ns$ for case 1 (curve 80), case 2 (curve 82), case 3 (curve 84) and case 5 (curve 86).

A novel aspect of the present invention occurs in the second step (Step 2 from FIG. 1), which tests for whether or not traffic energy is detected on the F-DCCH channel during the current frame. A prior art method calculated the energy ratio of traffic bits to PCB bits from $$\frac{1}{16}\sum_{pcg=1}^{16}\left(\left(\sum_{i=1}^{Npath} Es_{traf,i}\right)\bigg/\left(\sum_{i=1}^{Npath} Es_{pcb,i}\right)\right) < \text{Thr\_2}$$

where the sum is over all locked fingers and sixteen power control groups per frame, and division occurs each at the end of each PCG.

A second prior art method modified this to obtain the maximum combined ratio of traffic to noise SNR divided by PCB to noise SNR from $$\left\|\sum_{i=1}^{Npath}\left(\frac{\sum_{pcg=1}^{16} Es_{traf,i}}{\sum_{pcg=1}^{16} Ns_i}\right)\right\| \bigg/ \left\|\sum_{i=1}^{Npath}\left(\frac{\sum_{pcg=1}^{16} Es_{pcb,i}}{\sum_{pcg=1}^{16} Ns_i}\right)\right\| < \text{Thr\_2}$$

In this case, the decision as to whether or not the current F-DCCH frame has traffic transmitted on it depends on accumulating the maximal combined energy to noise ratios in a traffic symbol averaged over a frame and dividing this by the accumulated maximal combined energy to noise ratio in the PCB bits averaged over a frame. Up to nine separate registers are used to accumulate power per branch for PCB power, traffic power and noise power on each of three separate fingers. The division operations occur at the end of the frame. This requires additional hardware and calculation complexity.

In contrast, the present invention accumulates the maximal combined energy to noise ratio in a traffic symbol over the entire frame. This involves only the first quotient of the equation above so that the calculation involves about half the complexity. Only six registers are needed to accumulate the power from up to three traffic and noise paths. At most, three divisions will occur at the end of each frame, thereby saving hardware and calculations. The same normalization correction as introduced for step 1 (of FIG. 1) is applied for the cases that involve more than one path, resulting in:

$$\left\|\sum_{i=1}^{Npath}\left(\frac{\sum_{pcg=1}^{Npcg} Es_{traf,i}}{\sum_{pcg=1}^{Npcg} Ns_i}\right)\right\| - (Npath-1)E\left[\frac{Ns_{pcb}}{Ns}\right] < \text{Thr\_2}$$

As a result, using the second prior art method for 1-path cases, the optimal SNR value for Thr_2 is in the range 0.633 to 0.667 (−2 dB to −1.76 dB). Probability of detection of a random frame (CRC maybe good or bad) with Thr_2 set to 0.667 dB is about 96%, while the probability of a false alarm is about 8.9%. In addition, scaling of the multi-path cases requires a different threshold than that used in the single-path case. For 3-Path Rayleigh fading, the optimal setting for Thr_2 is 0.800 (−0.97 dB), for which the probability of detection is 83.4% with a 10.1% probability of false alarm.

In contrast, using the method of the present invention, a single value of threshold 2 can be used for the 1-path and 3-path cases. In all cases, the optimal Thr_2 of 1.15 leads to a probability of detection of better than 98% with a probability of false alarm of less 1%. There is also a relatively wide range of values from 1.05 to 1.20 for Thr_2 wherein the probability of detection remains above 95% and the probability of false alarm is less than 5%. This makes the present invention robust against small measurement or numerical approximation errors that implementations of the algorithm used by the mobile station may incur.

In summary, from the tabulated results presented Tables 2 and 3, it is seen that using maximal combined ratio of traffic signal to noise power, $Es_{traf}/Ns$, is an effective method of determining with a high reliability whether or not a traffic signal is present on the CDMA F-DCCH channel during intermittent transmissions. It gives superior results when compared to using $Es_{traf}/Es_{pcb}$ as used in the prior art. The cases for which the simulation modeling was performed are typical of a high FER environment for which forward power control will need to function. In addition, the calculations needed can be efficiently provided in a simple hardware implementation.

By appropriately selecting a normalization scaling factor, the same $Es_{traf}/Ns$ threshold can be used independent of the number of multipaths. There is also a wide range of values about the threshold for which the present invention performs robustly. Finally, choosing Thr_2 based on the ratio of $Es_{traf}/Ns$ decouples the second threshold from the first $Es_{pcb}/Ns$ threshold. It is an advantage for the thresholds to be independent of each other as this allows for fewer thresholds to be calculated, and the value of threshold 2 does not need to be recalculated if threshold 1 happens to change.

TABLE 2

Performance Summary For The Second Prior Art Method

| Prior Art Method | Threshold 1 (Thr_1) | Threshold 2 (Thr_2) | Probability of a Detection | Probability of a False Alarm |
|---|---|---|---|---|
| Case 1 | 1.375–1.50 | .633–.667 | 96.8% | 9.1% |
| Case 2 | 1.375–1.50 | .633–.667 | 96.6% | 14.8% |
| Case 3 | 1.375–1.50 | .633–.667 | 98.2% | 4.7% |
| Case 4 | 1.375–1.50 | .700–.733 | 94.9% | 15.4% |
| Case 5 | 1.375–1.50 | .766–.800 | 83.4% | 18.5% |

TABLE 3

Performance Summary For The Present Invention

| Present Invention | Threshold 1 (Thr_1) | Threshold 2 (Thr_2) | Probability of a Detection | Probability of a False Alarm |
|---|---|---|---|---|
| Case 1 | 1.375–1.50 | 1.10–1.15 | 99.9% | 0.3% |
| Case 2 | 1.375–1.50 | 1.10–1.15 | 99.9% | 0.3% |
| Case 3 | 1.375–1.50 | 1.10–1.15 | 98.3% | 0.6% |
| Case 4 | 1.375–1.50 | 1.10–1.15 | 96.7% | 2.0% |
| Case 5 | 1.375–1.50 | 1.10–1.15 | 99.1% | 3.0% |

As can be seen, the present invention has the advantage of being less sensitive to environmental conditions and provides improved performance over a larger and constant range of second threshold (Threshold 2) than does the prior art.

While the foregoing described embodiments have been set forth above, it will be appreciated to one skilled in the art that the invention described has applications beyond the described embodiments. Accordingly, it is intended that the scope of the invention including such alternatives, modifications, and variations contemplated shall be defined by the appended claims.

What is claimed is:

1. A method for forward power control in spread spectrum communication systems, the method comprising the steps of:

inputting data from a receiver;

providing an error check to determine which of the data is in error;

determining an energy level of power control bits and traffic bits in the data from the providing step;

comparing the energy level of the power control bits against a first predetermined threshold wherein if the energy level of the power control bits is less than the first predetermined threshold subsequently indicating the need for increased forward power and returning to the inputting step; otherwise comparing the energy level of the traffic bits against a second predetermined threshold wherein if the energy level of the traffic bits is less than the second predetermined threshold subsequently indicating the need for decreased forward power, otherwise indicating the need for increased forward power.

2. The method of claim 1, wherein the inputting step includes the data being symbols in a frame of data and the providing step includes the error check being a CRC check to determine frame errors.

3. The method of claim 1, wherein the determining step includes determining a signal-to-noise ratio of the power control bits and traffic bits.

4. The method of claim 1, wherein the inputting step includes inputting data from a forward dedicated control channel and the receiver is a RAKE receiver with a traffic path and a pilot path.

5. The method of claim 4, wherein the inputting step includes the F-DCCH having discontinuous traffic transmissions.

6. The method of claim 4, wherein the determining step includes determining a signal-to-noise ratio of the power control bits as $Es_{pcb}/Ns$ over all locked receiver fingers and power control groups minus a normalization correction of an expected ratio of a noise power per symbol of the power control bits divided by a noise power per symbol of a pilot channel of the input data.

7. The method of claim 4, wherein the determining step includes determining a signal-to-noise ratio of the traffic bits as $Es_{traf}/Ns$ over all locked receiver fingers and power control groups minus a normalization correction of an expected ratio of a noise power per symbol of the power control bits divided by a noise power per symbol of a pilot channel of the input data.

8. The method of claim 4, wherein the determining step includes the power control and traffic bit energies being obtained from unrotated power control bits and traffic bits, respectively, taken from the traffic path and both the power control and traffic bit energies being divided by an estimate for noise power density obtained from a pilot path of the receiver to provide the bit energy per noise power density for the power control bits and the traffic bits.

9. The method of claim 8, wherein the determining step includes the noise power density being scaled according a traffic Walsh length.

10. A method for forward power control in spread spectrum communication systems, the method comprising the steps of:

inputting a frame of data from a RAKE receiver with a traffic path and pilot path;

providing an error check to determine which of the data is in error;

determining a signal-to-noise ratio of power control bits and traffic bits in the data from the providing step;

comparing the signal-to-noise ratio of the power control bits against a first predetermined threshold wherein if the signal-to-noise ratio of the power control bits is less than the first predetermined threshold subsequently indicating the need for increased forward power and returning to the inputting step; otherwise comparing the signal-to-noise ratio of the traffic bits against a second predetermined threshold wherein if the signal-to-noise ratio of the traffic bits is less than the second predetermined threshold subsequently indicating the need for decreased forward power, otherwise indicating the need for increased forward power.

11. The method of claim 10, wherein the providing step includes the error check being a CRC check.

12. The method of claim 10, wherein the inputting step includes inputting data from a forward dedicated control channel with discontinuous transmissions.

13. The method of claim 10, wherein the determining step includes determining the signal-to-noise ratio of the power control bits as $Es_{pcb}/Ns$ over all locked receiver fingers and power control groups minus a normalization correction of an expected ratio of a noise power per symbol of the power control bits divided by a noise power per symbol of a pilot channel of the input data.

14. The method of claim 10, wherein the determining step includes determining the signal-to-noise ratio of the traffic bits as $Es_{traf}/Ns$ over all locked receiver fingers and power control groups minus a normalization correction of an expected ratio of a noise power per symbol of the power control bits divided by a noise power per symbol of a pilot channel of the input data.

15. The method of claim 10, wherein the determining step includes the power control and traffic bit energies being obtained from unrotated power control bits and traffic bits, respectively, taken from the traffic path and both the power control and traffic bit energies being divided by an estimate for noise power density obtained from a pilot path of the receiver to provide the bit energy per noise power density for the power control bits and the traffic bits, wherein the estimated noise power density is scaled according a traffic Walsh length.

16. A method for forward power control in spread spectrum communication systems, the method comprising the steps of:
inputting a frame of data from a forward dedicated control channel with discontinuous transmissions in a RAKE receiver having a traffic path and a pilot path;
providing a CRC check to determine which of the data is in error;
determining a signal-to-noise ratio of power control bits and traffic bits in the data by obtaining unrotated power control bits and traffic bits, respectively, taken from the traffic path, and both the power control and traffic bit energies being divided by an estimate for noise power density obtained from the pilot path to provide the bit energy per noise power density for the power control bits and the traffic bits;
comparing the signal-to-noise ratio of the power control bits against a first predetermined threshold wherein if the signal-to-noise ratio of the power control bits is less than the first predetermined threshold subsequently indicating the need for increased forward power and returning to the inputting step; otherwise
comparing the signal-to-noise ratio of the traffic bits against a second predetermined threshold wherein if the signal-to-noise ratio of the traffic bits is less than the second predetermined threshold subsequently indicating the need for decreased forward power, otherwise indicating the need for increased forward power.

17. The method of claim 16, wherein the determining step includes determining the signal-to-noise ratio of the power control bits as $Es_{pcb}/Ns$ over all locked receiver fingers and power control groups minus a normalization correction of an expected ratio of a noise power per symbol of the power control bits divided by a noise power per symbol of a pilot channel of the input data.

18. The method of claim 16, wherein the determining step includes determining the signal-to-noise ratio of the traffic bits as $Es_{traf}/Ns$ over all locked receiver fingers and power control groups minus a normalization correction of an expected ratio of a noise power per symbol of the power control bits divided by a noise power per symbol of a pilot channel of the input data.

19. The method of claim 16, wherein the determining step includes the noise power density being scaled according a traffic Walsh length.

20. The method of claim 16, wherein the second comparing step includes the threshold comparison $$\left\| \sum_{i=1}^{Npath} \left( \frac{\sum_{pcg=1}^{N_{pcg}} Es_{traf,i}}{\sum_{pcg=1}^{N_{pcg}} Ns_i} \right) \right\| - (Npath - 1)E\left[\frac{Ns_{pcb}}{Ns}\right] < \text{Thr}\_2$$

where $N_{pcg}$ is the number of power groups per frame, $N_{path}$ is the number of multipaths, $Ns_i$ are the noise symbol power samples for each branch corresponding to a locked finger, $E[\ ]$ is the expected value of the ratio of the noise power per symbol in the PCB bits, $Ns_{pcb}$, to the noise power per symbol as estimated from the pilot channel, $Ns$.

* * * * *